Nov. 25, 1969 J. G. CODINA 3,480,908

SEISMOGRAPH

Filed May 16, 1968

INVENTOR
JORGE G. CODINA

BY Bacon & Thomas
ATTORNEYS

United States Patent Office 3,480,908
Patented Nov. 25, 1969

3,480,908
SEISMOGRAPH
Jorge G. Codina, Hartsdale, N.Y., assignor to Gravimetrics Incorporated, Washington, D.C., a corporation of Delaware
Filed May 16, 1968, Ser. No. 729,745
Int. Cl. G01v 1/18
U.S. Cl. 340—17         13 Claims

ABSTRACT OF THE DISCLOSURE

A seismograph for measuring seismographic disturbances with extremely high sensitivity and accuracy, utilizing a mass which is free to move incrementally in any direction and a frame which receives the disturbance. The mass has an equilibrium position in the absence of disturbance, but is moved incrementally in the presence of disturbance. The mass is moved under the influence of a servo controlled electromagnetic field, and signals varying with both direction and severity of the disturbance are generated by the mass movement.

Summary of the invention

In accordance with my invention, seismographic disturbances are transmitted to a frame having a chamber. An electromagnet is secured to the frame and is adapted to produce a levitational magnetic field in the chamber. The strength of the field varies monotonically with the excitation of the electromagnet. The spacial distribution of the field is such that it is symmetric about a vertical axis, the field intensity at the axis having an extremum value (i.e., either a maximum or a minimum) and varying monotonically with increasing radial distance from the axis.

A magnetic body is positioned below the electromagnet in said chamber and is subject both to the levitational force of the field and to the downward pull of gravity, whereby the body is suspended in space. The body, in the absence of any seismographic disturbance transmitted to the frame, is disposed in an equilibrium position relative to the electromagnet vertically confined within a small vertical zone aligned with the axis of symmetry of the field. Moreover, when the disturbances are transmitted to the frame and hence are applied to the electromagnet, the body, which has a small but finite mass, is momentarily displaced from the equilibrium position relative to the electromagnet. The direction and magnitude of the displacement is a monotonic function of the direction and severity of the disturbance.

First means coupled to the electromagnet to control the excitation thereof is responsive to a variable control signal to vary the excitation, the excitation varying monotonically with variations of the control signal.

Second means responsive to the momentary displacement of the body generates a first output signal varying with changes in the vertical position of the body and a second output signal varying with changes in the horizontal position of the body.

Third means responsive to both first and second output signals derives therefrom the control signal and supplies same to the first means to vary the excitation of the electromagnet in such manner as to return the body to equilibrium position.

As a result, an electrical signal, obtained either from the control signal or the two output signals, provides an electrical measurement of seismographic disturbances.

My seismograph employs no restraining techniques upon the movement of the body produced by the disturbances other than constraints of the magnetic field and conventional damping mechanisms are not used. My invention results in a small light weight compact instrument which can have great sensitivity and produces signals which can be automatically graphed or can be fed directly into a computer for processing.

Detailed description of preferred embodiments

Figure 1:
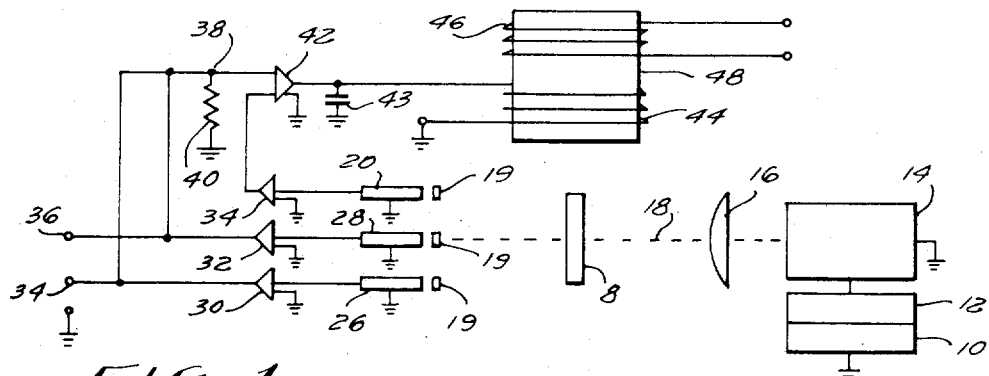
FIG. 1 is a block diagram of my seismograph.
Figure 2:
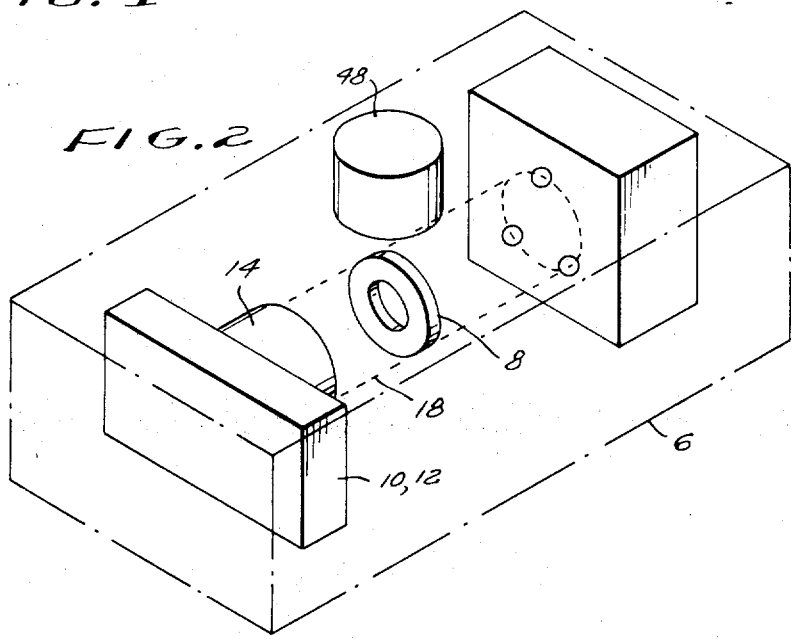
FIG. 2 is an enlarged perspective view of one physical embodiment of my seismograph.

Referring now to FIGS. 1 and 3 magnetic body such as a sphere or disc 8 lying in a vertical plane is disposed within a transparent vacuum tight chamber 6. An oscillator 10 produces an oscillatory signal of constant frequency. This signal is supplied to the input of modulator 12 which actually functions as a chopper to interrupt the signal at a constant rate. The interrupted signal is then supplied to light source 14 of narrow bandwidth (which is substantially monochromatic) whereby pulsating light is emitted from the source. This pulsating light impinges upon lens system 16 which converts the incident light into a collimated beam of light 18 having a horizontal axis aligned with the center of the disc and having, in a vertical cross section aligned with the vertical plane of the disc, the shape of a circle with a diameter larger than that of the sphere. The light passing around the disc impinges upon one end of each of first and second horizontally extending photosensors 26 and 28 which lie in a horizontal plane and which are aligned with opposite points on the disc periphery. To assist in obtaining monochromatic light, interference filters 19 can be placed in front of each photosensor. This light further impinges upon one end of a third photosensor 20 which is vertically displaced upward from, is parallel to and is disposed between photosensors 26 and 28, and defines together with these two other photosensors the vertices of an equilateral triangle.

Disc 8 is positioned in a vertical zone in the chamber in the path of the beam because of the levitational action discussed in more detail hereinafter.

Each photosensor converts incident light to an alternating current signal.

The outputs from sensors 26 and 28 are fed through corresponding alternating current horizontal amplifiers 30 and 32 to output terminals 34 and 36 and are also fed to a common terminal 38 connected to ground via summation resistor 40. Terminal 38 is connected to the input of a servo amplifier 42. The output of photosensor 20 is fed through an alternating current vertical amplifier 44 which yields a vertical output signal supplied as a second input to amplifier 42. The output of amplifier 42 is grounded via capacitor 43 and is connected to a first field winding 44 of an electromagnet 48 which is disposed at the top of chamber 6. This magnet produces a levitational magnetic field which is symmetric about a vertical axis with the vertical axis of the disc when in stable position. This field exerts a levitational action on disc 8 which counterbalances the downward pull of the total weight of the disc whereby it is held in the designed vertical zone. Magnet 48 is so contoured so that the field intensity for a given excitation has an extreme value (i.e., either a maximum or a minimum) at the vertical axis of symmetry and varies monotonically (either increasing from the minimum or decreasing from the maximum) with radical displacement from this axis.

For the purpose of clarity, the conventional power supply energizing the magnet and the various units shown in block form in FIG. 1 as well as the conventional connections of the supply to the magnet and units have been omitted and will not be referred to herein.

Figure 3A:
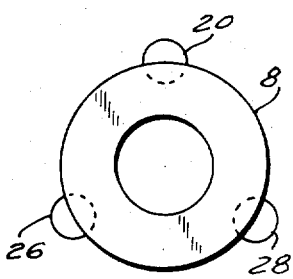
FIGS. 3a, 3b, and 3c are detail views illustrating certain relationships between a magnetic body, a light beam and optical sensors as required in my seismograph.

Referring now to FIG. 3a, the light beam as it passes around the disc and impinges upon the three photosensors defines an annular ring of light 80. When the disc is exactly centered, all photosensors receive the same amount of light and with all photosensors being exactly matched, the output signals from all sensors are identical. Servo amplifier 42 is so designed that its output under these conditions produces a control signal which holds the disc in center equilibrium position indicating no seismographic disturbance. The control signal is integrated via capacitor 43 before arriving at winding 44. A second winding 46 on electromagnet 48 derives a signal from winding 42 which is an electrical measurement of such disturbance.

Figure 3B:
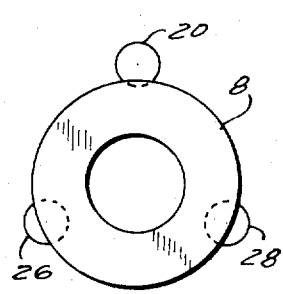

When, as shown in FIG. 3b, the chamber and magnet are subjected to a vertically upward disturbance, the disc because of its small but finite mass stays in place momentarily, and the amount of light on photosensors 26 and 28 increases while the amount of light on sensor 20 decreases. The resultant inequality of the inputs to amplifier 42 produces a signal proportional to the vertical disturbance which is supplied to winding 44 with such phase and amplitude as to increase the excitation and raise the disc to equilibrium. The polarity and magnitude of the measurement signal on winding 46 indicates the severity and direction of the vertical disturbance.

Should the chamber and magnet be subjected to a vertically downward disturbance, the same action will occur but the instantaneous polarity of the signal supplied winding 44 will be reversed and the polarity of the measurement signal will also be revised. In either situation, the intensity of the magnetic field is varied in such manner as to restore the sphere to the center position.

Figure 3C:
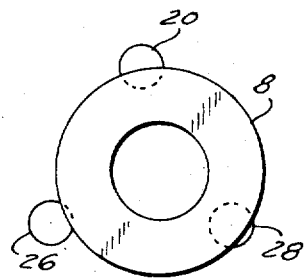

FIG. 3c illustrates the position of the disc when the frame is subject to a horizontal disturbance. As the frame moves incrementally and horizontally along a line perpendicular to the horizontal sensors, the disc remaining in place, the amount of light on one of sensors 26 and 28 increases while the amount on the other one of these sensors decreases, thus producing horizontal output signals of one or another polarity which can be processed by a computer coupled to terminals 34 and 38. However, even when no vertical disturbance is present, because of the contoured magnetic field, the disc must move vertically and incrementally whenever it is to be moved horizontally to equilibrium. Resultant changes in the output of amplifier 42 generate the control signal required to restore the sphere to the center position. The signal appearing at winding 46 must be combined with signals at terminals 34 and 38 in the computer to produce the desired disturbance measurement signal. When vertical and horizontal disturbance components are present, the action is the same as in FIG. 3c, except that the vertical movement is more pronounced.

While I have described my invention with particular reference to a preferred embodiment many variations within the scope and sphere of my invention will be apparent to those skilled in the art.

I claim:
1. A seismograph comprising:
 (a) a hollow frame adapted to receive seismographic disturbances, said frame having a chamber;
 (b) a electromagnet secured in said frame and adapted to produce a levitational magnetic field which varies monotonically with the excitation of the electromagnet, the spacial distribution of said field defining a pattern symmetric about a vertical axis, the intensity at the axis having an extremum value and varying monotonically with increasing radial distance from the axis;
 (c) a magnetic body positioned below said electromagnet and subject both to the levitational force of the field and to the downward pull of gravity whereby said body is suspended in space, said body in the absence of said disturbances having an equilibrium position relative to the electromagnet vertically confined in a small vertical zone aligned with said axis, said body because of its finite although small mass being momentarily displaced from the equilibrium position when said disturbances are received by the frame and transmitted to the electromagnet, the direction and magnitude of the displacement being a monotonic function of the direction and severity of the disturbance;
 (d) first means coupled to said electromagnet to vary the excitation thereof, said first means being responsive to a variable control signal to vary said excitation, the excitation varying monotonically with variations of the control signal;
 (e) second means responsive to changes in position of said body to generate a first output signal varying with changes in vertical position of said body and a second output signal varying with changes in the horizontal position of said body; and
 (f) third means responsive to both output signals to derive said control signal therefrom and to supply said control signal to said first means whereby said body is returned to equilibrium position, said control signal or said output signals providing an electrical measurement of said disturbances.

2. A seismograph as set forth in claim 1 wherein said second means includes a light source for directing a horizontal light beam through said zone, said body partially intercepting said beam, said beam after passing said body developing three horizontally extending spaced apart parallel components which as viewed in cross section define vertices of an equilateral triangle.

3. A seismograph as set forth in claim 2 wherein said second means includes three photosensors each located at a different one of said vertices and responsive to the corresponding component of the light beam; said body being disposed between said light source and said photosensors.

4. A seismograph as set forth in claim 3 wherein said light beam is modulated.

5. A seismograph as set forth in claim 1 further including additional means responsive to said control signal to produce a measurement signal which is an electrical measurement of the disturbance.

6. A seismograph as set forth in claim 5 wherein said additional means is inductively coupled to the magnetic field.

7. A seismograph as set forth in claim 6 wherein said additional means includes a second winding on the electromagnet.

8. A seismograph as set forth in claim 2 wherein said light beam is collimated.

9. A seismograph as set forth in claim 1 wherein the third means is a servo amplifier.

10. A seismograph as set forth in claim 1 wherein said body is an annular disc.

11. A seismograph as set forth in claim 3 wherein said source is essentially monochromatic.

12. A seismograph as set forth in claim 11 further including interference filters disposed in front of each photosensor.

13. A seismograph as set forth in claim 1 wherein said second means includes horizontal and vertical alternating current amplifiers.

References Cited
UNITED STATES PATENTS

| | | | |
|---|---|---|---|
| 2,435,231 | 2/1948 | McPherson | 340—17 |
| 2,677,270 | 5/1954 | Sanderson | 340—17 X |
| 3,073,550 | 1/1963 | Young | 244—3.21 |

RODNEY D. BENNETT, Primary Examiner

BRIAN L. RIBANDO, Assistant Examiner

U.S. Cl. X.R.

73—71.1